United States Patent
Murata

(10) Patent No.: US 10,210,057 B2
(45) Date of Patent: Feb. 19, 2019

(54) INFORMATION PROCESSING APPARATUS WITH MEMORY BACKUP FUNCTION FOR POWER FAILURE

(71) Applicant: FUJITSU LIMITED, Kawasaki-shi, Kanagawa (JP)

(72) Inventor: Takehiko Murata, Kanazawa (JP)

(73) Assignee: FUJITSU LIMITED, Kawasaki (JP)

( * ) Notice: Subject to any disclaimer, the term of this patent is extended or adjusted under 35 U.S.C. 154(b) by 125 days.

(21) Appl. No.: 14/963,345

(22) Filed: Dec. 9, 2015

(65) Prior Publication Data

US 2016/0179640 A1    Jun. 23, 2016

(30) Foreign Application Priority Data

Dec. 22, 2014  (JP) .................. 2014-258587

(51) Int. Cl.
| | | |
|---|---|---|
| *G06F 11/00* | (2006.01) | |
| *G06F 11/20* | (2006.01) | |
| *G06F 11/14* | (2006.01) | |

(52) U.S. Cl.
CPC ...... *G06F 11/2015* (2013.01); *G06F 11/1441* (2013.01)

(58) Field of Classification Search
USPC .......................................................... 714/14
See application file for complete search history.

(56) References Cited

U.S. PATENT DOCUMENTS

| | | | | |
|---|---|---|---|---|
| 7,634,688 B2 * | 12/2009 | Madter | ............... | G06F 12/0804 |
| | | | | 714/14 |
| 8,060,767 B1 * | 11/2011 | Wright | .................... | G06F 1/24 |
| | | | | 713/320 |
| 8,200,885 B2 * | 6/2012 | Sartore | ............... | G06F 12/0638 |
| | | | | 711/100 |

(Continued)

FOREIGN PATENT DOCUMENTS

| | | |
|---|---|---|
| JP | 2006-172326 A | 6/2006 |
| JP | 2009-93295 | 4/2009 |

(Continued)

OTHER PUBLICATIONS

Linux Kernel Documents, Item 2.3.2 Figure 2-2, https://osdn.jp/projects/linux-kernel-docs/wiki/2.3%E3%80%80%E3%83%8F%E3%83%BC%E3%83%89%E3%82%A6%E3%82%A7%E3%82%A2%E5%89%B2%E3%82%8A%E8%BE%BC%E3%81%BF%E5%87%A6%E7%90%86, Partial English Translation (2 pages).

(Continued)

*Primary Examiner* — Amine Riad
(74) *Attorney, Agent, or Firm* — Fujitsu Patent Center

(57) ABSTRACT

An information processing apparatus includes: a power-failure detector that detects a halt of power supply from a power source; a standby power supply that supplies, when the power supply from the power source is halted, standby power to a processor, a memory, and a storing device; and a disconnector that disconnects communication between the processor and a peripheral device. When the power-failure detector detects the halt of power supply from the power (Continued)

source, the disconnector disconnects the communication between the processor and the peripheral device and the processor carries out a memory backup process that reads data from the memory and stores the read data into the storing device. With this configuration, the memory backup process is surely carried out even in the event of power failure.

8 Claims, 9 Drawing Sheets

(56) References Cited

U.S. PATENT DOCUMENTS

| | | | |
|---|---|---|---|
| 8,862,809 B2* | 10/2014 | Zettsu | G06F 12/02 |
| | | | 711/103 |
| 2006/0101307 A1* | 5/2006 | Rapp | G06F 9/54 |
| | | | 714/13 |
| 2009/0094473 A1 | 4/2009 | Mizutani | |
| 2011/0066884 A1 | 3/2011 | Suzuki | |
| 2012/0102370 A1 | 4/2012 | Yoshida et al. | |
| 2012/0278600 A1 | 11/2012 | Mese et al. | |
| 2013/0018948 A1 | 1/2013 | Douillet et al. | |

FOREIGN PATENT DOCUMENTS

| | | |
|---|---|---|
| JP | 2011-65480 A | 3/2011 |
| JP | 2011-232986 | 11/2011 |
| JP | 2012-234539 | 11/2012 |
| JP | 2013-33472 | 2/2013 |

OTHER PUBLICATIONS

Japanese Office Action dated Jun. 19, 2018 for corresponding Japanese Patent Application No. 2014-258587, with Partial English Translation, 5 pages.

* cited by examiner

INFORMATION PROCESSING APPARATUS WITH MEMORY BACKUP FUNCTION FOR POWER FAILURE

CROSS-REFERENCE TO RELATED APPLICATION

This application is based upon and claims the benefit of priority of the prior Japanese Patent application No. 2014-258587, filed on Dec. 22, 2014, the entire contents of which are incorporated herein by reference.

FIELD

The embodiment discussed herein is related to an information processing apparatus.

BACKGROUND

A Field Programmable Gate Array (FPGA) is a device known for its capability of electrically modifying the design of the digital circuit. An FPGA is a Large Scale Integration circuit (LSI) having many logic gates and functions as an intended logic circuit by writing configuration data describing therein logical and connection relationships among logic gates into a configuration RAM that the FPGA has.

Using FPGAs as the circuit parts of various electronic devices makes it possible to shorten the time that the circuit implementation takes as compared with cases where circuit parts are manufactured according to circuit design. Further advantageously, the circuit design can be easily modified simply by modifying the configuration data, not requiring a change in hardware.

FPGAs are used in wide variety of products as well as in electronic devices. As one of the usages, there has been known a power-failure dealing system being mounted on a server computer and being equipped with an FPGA in which system the FPGA achieves backup of Dual Inline Memory Module (DIMM) data.

FIG. 9 is a block diagram schematically illustrating the configuration of a typical power-failure dealing system.

The typical power-failure dealing system of FIG. 9 includes a Central Processing Unit (CPU) 501, a peripheral device 502, a memory controller 503, a monitoring FPGA 504, a DIMM 505, a storage device 506, and a power-failure FPGA 507.

The CPU 501 is a processor that carries out various controls and calculations, and specifically achieves various functions by executing the Operating System (OS) and a program.

The peripheral device 502 is a hardware device exemplified by a display device, an I/O controller, and an interfacing device, and is communicably connected to the CPU 501 via an interface such as a Peripheral Component Interconnect Express (PCIe) interface.

The storage device 506 is exemplified by a Hard disk drive (HDD) and a Solid State Drive (SSD), and stores therein various pieces of data.

The DIMM 505 is a storing region that stores therein various pieces of data and a program. When the CPU 501 is to execute a program, data and the program to be used in the execution are stored and expanded in the DIMM 505. In the event of power failure, a copy of data stored in the DIMM 505 is stored (i.e., backed up) in the storing device 506.

The memory controller 503 manages data access to the DIMM 505 for reading data from or writing data into the DIMM 505.

The monitoring FPGA 504 detects power failure, and when detecting the occurrence of power failure, controls to halt power supply to the CPU 501 and the peripheral device 502. In the event of power failure, a non-illustrated standby power source such as a super capacitor supplies electric power to the memory controller 503, the monitoring FPGA 504, the DIMM 505, the storage device 506, and the power-failure FPGA 507.

A power-failure FPGA 507 controls, in the event of power failure, to back up data in the DIMM 505 into the storage device 506 via the memory controller 503 by means of Direct Memory Access (DMA).

In the typical power-failure dealing system 500 of FIG. 9, even when power failure occurs, the presence of a standby power source makes it possible to continue power supply to the memory controller 503, the monitoring FPGA 504, the DIMM 505, the storage device 506, and the power-failure FPGA 507.

Then the power-failure FPGA 507 backs up data in the DIMM 505 into the storage device 506 via memory controller 503 by means of DMA. Namely, when power failure occurs, the power-failure FPGA 507 backs up data in the DIMM 505 totally independently from the CPU 501, being supplied with power from the standby power source. Hereinafter, backing up data in the DIMM 505 into the storing device 506 during power failure is sometimes referred to as "power-failure backup".

In contrast, during power failure, power supply to the CPU 501 and the peripheral device 502 is stopped to reduce power consumption of the standby power source.

As one solution to reduce the manufacturing cost of the above power-failure dealing system 500, relatively expensive FPGAs are omitted in the configuration of the power-failure dealing system 500.

In cases where the power-failure FPGA 507 is omitted, the standby power source supplies also the CPU 501 with power and the CPU 501 executes the firmware to achieve the function as the above power-failure backup.

Even in cases where power is supplied to the CPU 501 during the power failure, it is preferable to halt the power supply to the peripheral device 502, which consumes a relatively large amount of power.

[Patent Literature 1] Japanese Laid-open Patent Publication No. 2011-232986
[Patent Literature 2] Japanese Laid-open Patent Publication No. 2012-234539
[Patent Literature 3] Japanese Laid-open Patent Publication No. 2013-33472
[Patent Literature 4] Japanese Laid-open Patent Publication No. 2009-93295

However, the peripheral device 502 has a process being executed therein at the time of occurrence of power failure in the typical power-failure dealing system 500 that omits the power-failure FPGA 507 as the above, there is a possibility that an access to the peripheral device 502 is generated during the execution of the power-failure memory backup. Such an access to the peripheral device 502 is generated by the CPU 501 executing a device driver for the peripheral device 502.

When an access to the peripheral device 502 is generated under a state where no power is supplied to the peripheral device 502, a fatal error occurs in the system and a notification of NonMaskable Interrupt (NMI) is issued to the CPU 501. There is a possibility of not successfully executing the power-failure backup.

SUMMARY

According to an aspect of an embodiment, there is provided an information processing apparatus including a processor, a peripheral device, a storing device, a memory, a power-failure detector that detects a halt of power supply from a power source; and a standby power supply that supplies, when the power supply from the power source is halted, standby power to the processor, the memory, and the storing device; and a disconnector that disconnects communication between the processor and the peripheral device, wherein when the power-failure detector detects the halt of power supply from the power source, the disconnector disconnects the communication between the processor and the peripheral device and the processor carries out a memory backup process that reads data from the memory and stores the read data into the storing device.

The object and advantages of the invention will be realized and attained by means of the elements and combinations particularly pointed out in the claims. It is to be understood that both the foregoing general description and the following detailed description are exemplary and explanatory and are not restrictive of the invention.

DESCRIPTION OF EMBODIMENT(S)

Hereinafter, an information processing apparatus according to a first embodiment will now be detailed with reference to accompanying drawings. The following first embodiment is exemplary and has no intention to exclude various modifications and application of techniques not referred in the first embodiment. In other words, various changes and modifications (e.g., combining an embodiment and a modification) can be suggested without departing from the spirit of the first embodiment. The drawings do not illustrate therein all the functions and elements included in the embodiment and may include additional functions and elements to those illustrated in the accompanying drawings. The following embodiments can be appropriately combined, omitted, and selected according to the requirement.

Figure 1:
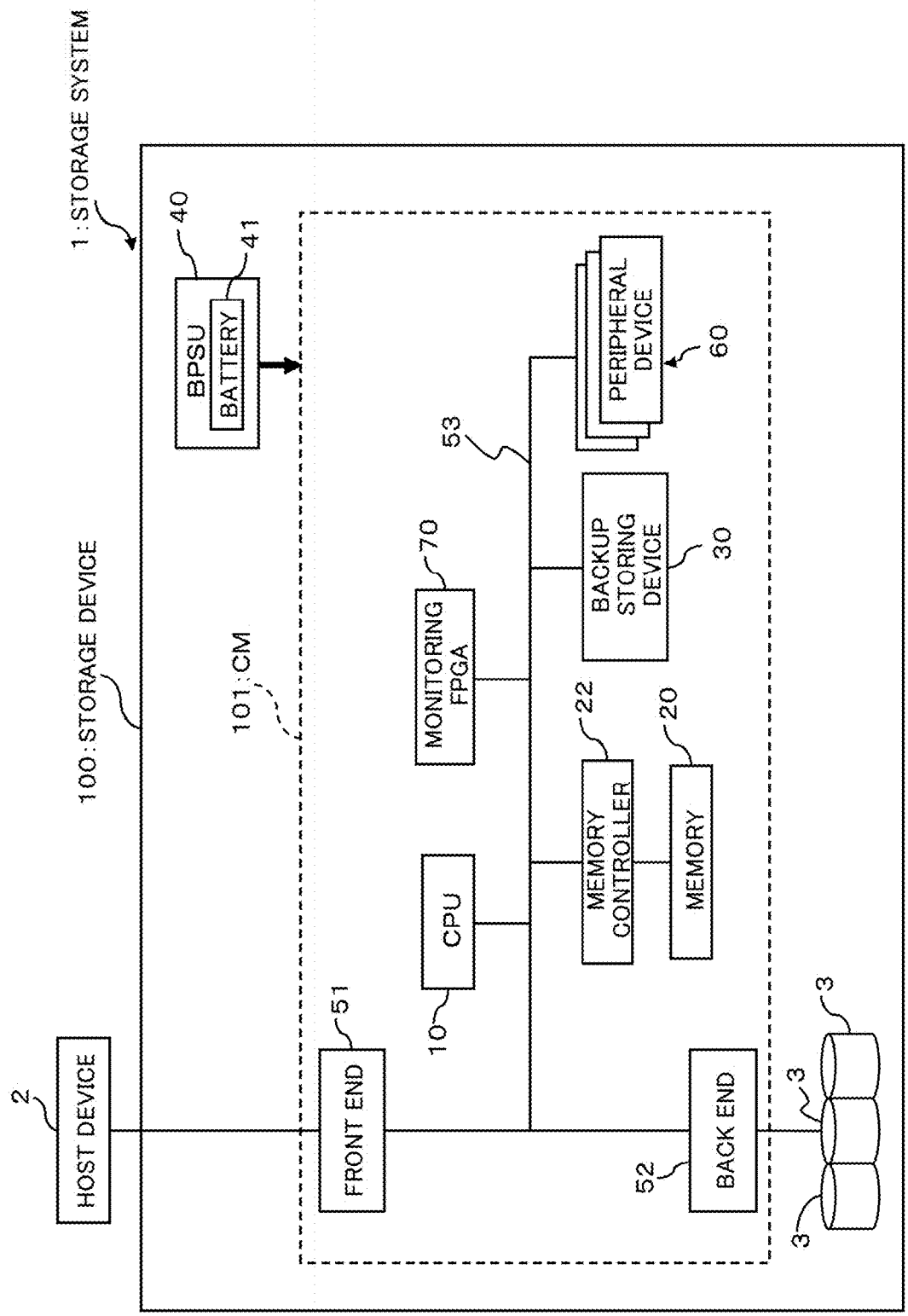
FIG. 1 is a diagram illustrating the hardware configuration of a storage system of an example according to a embodiment.
Figure 2:
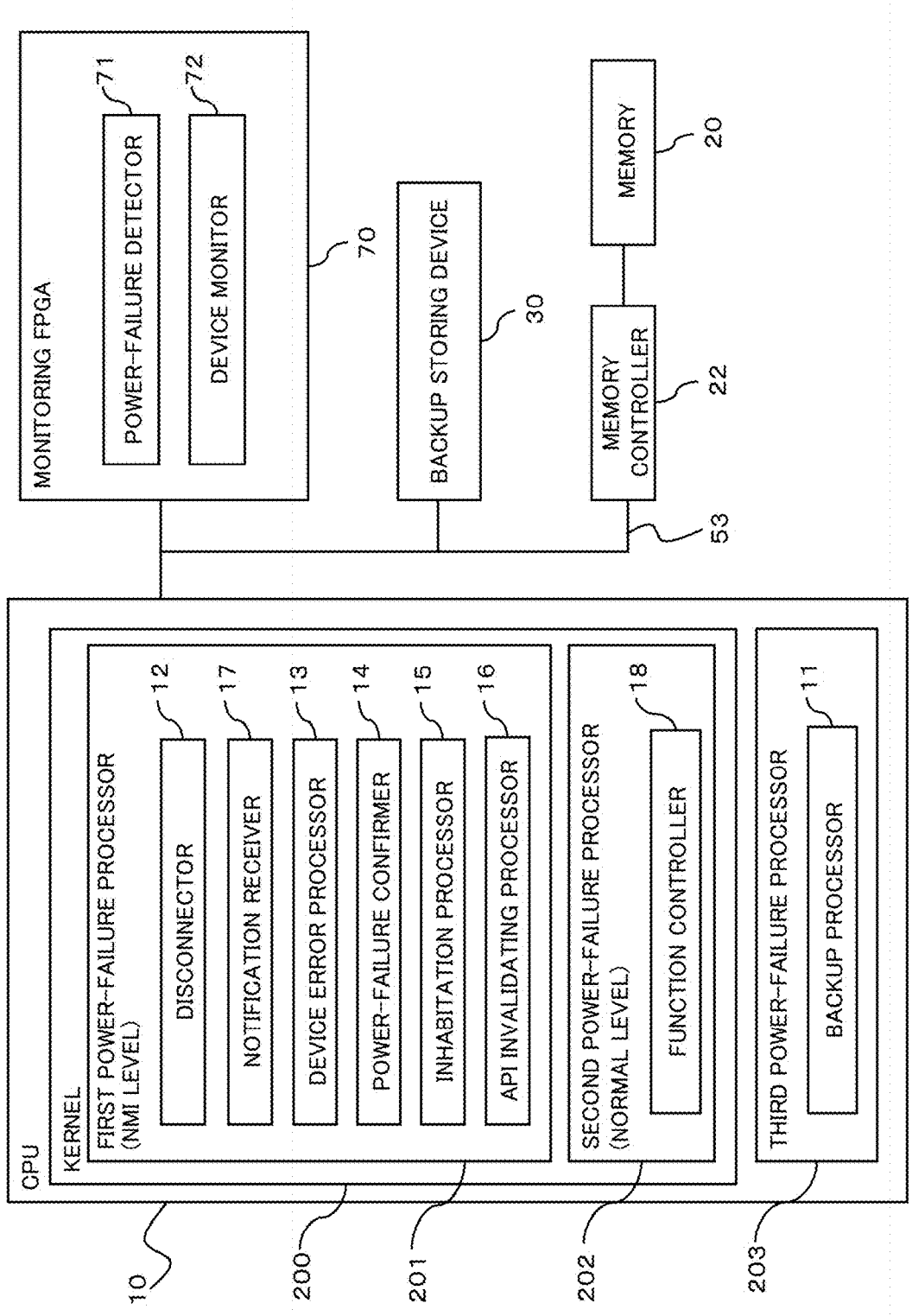
FIG. 2 is a diagram illustrating the functional configuration of a storage system of an example according to the embodiment.

(A) Configuration:

FIG. 1 illustrates the hardware configuration of a storage system 1 of the first embodiment; and FIG. 2 illustrates the functional configuration of the storage system 1.

As illustrated in FIG. 1, the storage system 1 of the first embodiment includes a storage device (information processing apparatus) 100 and one or more (one in the example of FIG. 1) host device 2. The storage system 1 provides a storing region to the host device 2. An example of the host device 2 is a computer (i.e., host computer) having a server function and being communicably connected to the storage device 100 via a network such as a Local Area Network (LAN).

As illustrated in FIG. 1, the storage device 100 includes a Controller Module (CM) 101, a Backup Power Supply Unit (BPSU) 40, and one or more (three in the example of FIG. 1) storage devices 3.

The storage device 3 is a storing device that stores therein data in a readable and writable manner and is exemplified by a Hard disk drive (HDD) and a Solid State Drive (SSD). Specifically, the storage device 3 functions as a storing unit capable of storing therein data received from the host device 2. This embodiment assumes that the storage device 3 is a HDD and is therefore sometimes referred to as a "HDD 3".

In FIG. 1, the storage device 100 includes three HDDs 3 as an example, but the number of HDDs are not limited to three. The storage device 100 may include two or less or four or more HDDs. The storage device 100 may alternatively be a Redundant Arrays of Inexpensive Disks (RAID) apparatus that manages multiple HDDs 3 as a single redundant storage unit. The following description of the first embodiment assumes that the storage device 100 is a RAID apparatus that forms RAID by using the multiple HDDs 3.

The BPSU 40 is a power supply device that supplies power to at least part of the CM 101 when power supply from a non-illustrated power supply is halted. Hereinafter, a state where power supply from the non-illustrated power supply is halted is sometimes referred to simply as "power failure".

In the event of power failure of the storage device 100, the BPSU 40 supplies power to, for example, the CPU 10, the memory 20, the memory controller 22, the monitoring FPGA 70, and the backup storing device 30 that are included in the CM 101.

As illustrated in FIG. 1, the BPSU 40 includes a battery 41. Examples of the battery 41 is a secondary battery such as a lead storage battery, a Nickel-Metal Hydride (Ni—H) battery, and a lithium-ion (Li-ION) battery. Alternatively, the battery 41 may be replaced with a capacitor, such as an electric double-layer capacitor.

The CM 101 is a controller (controller, computer) that controls operation in the storage device 100. For example, the CM 101 receives a command for reading/writing from the host device 2 and responsively carries out various controls. The CM 101 is connected to the network (not illustrated) via the front end 51. The CM 101 controls data access to the HDD 3 in obedience to a disk access command for reading/writing received from the host device 2.

As illustrated in FIG. 1, the CM 101 includes a front end 51, a back end 52, a CPU 10, a memory 20, a memory controller 22, a backup storing device 30, a peripheral device 60, and a monitoring FPGA 7.

The front end 51, the back end 52, the CPU 10, the memory 20, the memory controller 22, the backup storing device 30, the peripheral device 60, and a monitoring FPGA 7 are communicably connected to one another via a bus 53.

The front end 51 is an interface controller (communication adaptor) communicably connected to, for example, the host device 2 and is exemplified by a Channel Adaptor (CA). The front end 51 receives data from, for example, the host device 2 and sends data output from the CM 101 to, for example, the host device 2. This means that the front end 51 controls data input/output (I/O) between the CM 101 and an external device such as the host device 2.

The back end 52 is an interface controller (communication adaptor) communicably connected to the HDD 3 and is exemplified by a Device Adaptor (DA). The back end 52 sends to the HDD 3 data to be written into the HDD 3 and also receives data read from the HDD 3. This means that the back end 52 controls data I/O between the CM 101 and the HDD 3.

The memory 20 is a storing device including a Read Only Memory (ROM) and a Random Access Memory (RAM). In the ROM of the memory 20, a software program manages various controls performed in the storage device 100 and data used for executing the program are written. Accordingly, the program to control a power-failure control carried out when power failure occurs in the storage device 100 is written in the ROM.

A program on the memory 20 is properly read by the CPU 10, which then executes the read program. The RAM of the memory 20 is used as a primary storing memory or a working memory.

The RAM of the memory 20 functions as, for example, a RAID cache (i.e., cache memory).

The RAID cache stores therein data received from the host device 2 and data read from the HDD 3. Data (writing data, writing cache data) being received from the host device 2 and being also to be written into the HDD 3 is stored in a predetermined region (user region) of the RAID cache and then forwarded to the HDD 3.

The storage device 100 of the first embodiment regards, for example, a predetermined region to store writing data in the RAID cache as a backup target region, and stores a copy of the data being stored in the backup target region into the backup storing device 30 (memory backup).

The data (i.e., read data) read from the HDD 3 is stored in a region to store read data in the RAID cache, and then sent to the host device 2.

The backup storing device 30 is a non-volatile memory that holds its memory even when not being supplied with power and is exemplified by a HDD and an SSD. However, the backup storing device 30 is not limited to those examples, but various alternatives, such as a magnetoresistive RAM, a Phase change RAM (PRAM), and a ferroelectric random access memory, can be suggested.

When power failure occurs in the storage device 100, data stored in the backup target region, such as a RAID cache 21 of the memory 20, is stored into the backup storing device 30. In other words, the backup storing device 30 functions as a backup-destination storing device into which data in the backup target region is to be stored.

The peripheral device 60 is a hardware device communicably connected to the CPU 10 via the bus 53 and is exemplified by a network interface, an input/output controller, and an interface device.

The monitoring FPGA 70 is an FPGA having a function of monitoring whether an error occurs in the storage device 100. As illustrated in FIG. 2, the monitoring FPGA 70 has, for example, functions as a power-failure detector 71 and a device monitor 72.

The power-failure detector 71 detects occurrence of power failure in the storage device 100. The occurrence of power failure can be detected in various known manners. For example, the power-failure detector 71 may detect power failure by comparing a voltage value of power provided by the non-illustrated power source with a predetermined reference value or by receiving, from the power source or another device, a notification indicating that power failure occurs.

Upon detection of occurrence of power failure, the power-failure detector 71 carries out control of halting power supply to the peripheral device 60.

Upon detection of power failure, the power-failure detector 71 further instructs the BPSU 40 to supply power. This makes it possible to supply, even when power supply from the non-illustrated power source is halted, the respective elements in the CM 101 with power from the BPSU 40.

As described above, in the event of power failure, the storage device 100 of the first embodiment causes the battery 41 of the BPSU 40 to supply the CPU 10, the memory 20, the backup storing device 30, the memory controller 22, and monitoring FPGA 70 with power.

Upon detection of occurrence of power failure, the power-failure detector 71 further notifies the CPU 10 of the occurrence of power failure by means of a Non-Maskable Interrupt (NMI) (power-failure detection notification).

Furthermore, upon receipt of an inquiry to confirm as to whether power failure occurs from the CPU 10 (power-failure confirmer 14) to be detailed below, the power-failure detector 71 replies, when the power failure is occurring, with the CPU 10 with a response indicating that the power failure is occurring. This response may be accomplished by the power-failure detector 71 setting a flag "1" in a predetermined region in, for example, a register and then the CPU 10 confirming the value set in the flag; or by the power-failure detector 71 sending a signal indicating that the power failure is occurring to the CPU 10. Various modifications of the response can be suggested.

In addition, the monitoring FPGA 70 also has a function as the device monitor 72, which monitors whether an error occurs in the peripheral device 60. For example, the monitoring FPGA 70 determines that a device error has occurred when an access is generated to the peripheral device 60 to which power supply has been halted or when an access to a peripheral device 60 not existing is generated. The determination of occurrence of a device error may be carried out in any known manner, so detailed description is omitted here.

Upon determination that the device error has occurred, the device monitor 72 notifies the CPU 10 of the occurrence of the device error by means of NMI (device error notification).

The CPU 10 is a processing device that carries out various controls and calculations, and achieves various functions by executing the OS and programs (applications) stored in the memory 20.

For example, the CPU 10 has a function as a system controller for a RAID system, and specifically achieves RAID and various functions such as an alarm monitoring function and a path controlling function.

As illustrated in FIG. 2, the CPU 10 has functions as a first power-failure processor 201, a second power-failure processor 202, and a third power-failure processor 203. When power failure occurs in the storage device 100 of this embodiment, a power-failure process control is achieved by the functions of the first power-failure processor 201, the second power-failure processor 202, and the third power-failure processor 203.

The third power-failure processor 203 has a function as a backup processor 11.

The backup processor 11 copies data (backup data) in a predetermined region (i.e., the backup target region) of the RAM of the memory 20 into the predetermined region of the backup storing device 30. Hereinafter, copying backup data stored in the memory 20 into the backup storing device 30 is sometimes referred to as a memory backup process. The memory backup process is a power-failure dealing process carried out when power failure has occurred in the storage device 100. Hereinafter, the memory backup process performed as the power-failure dealing process is sometimes referred to as a task of the power-failure processing.

Upon receipt of a power-failure detection notification from the monitoring FPGA 70 (the power-failure detector 71), the backup processor 11 executes the memory backup process.

The first power-failure processor 201 has a function as a disconnector 12, a notification receiver 17, a device error processor 13, a power-failure confirmer 14, an inhabitation processor 15, and an Application Programming Interface (API) invalidating processor 16.

The disconnector 12 controls the peripheral device 60 to be made into an inaccessible state from the CPU 10 by disconnecting the communication between the CPU 10 and the peripheral device 60.

If the peripheral device 60 is, for example, a PCIe device configured to conform to the PCIe specification, the disconnector 12 makes the path connecting the CPU 10 with the peripheral device 60 into the link disable state using the link disable function of the PCIe.

For example, at a PCI device driver interface conforming to Linux®, the disconnector 12 disables the operation of the peripheral device 60 as a PCI device through the use of the void pci_disable_device( ) function".

This disconnects the communication between the CPU 10 and the peripheral device 60, and consequently invalidates the peripheral device (PCIe device) 60.

Upon receipt of a power-failure detection notification from the monitoring FPGA 70, the disconnector 12 disconnects the communication between the CPU 10 and the peripheral device 60.

The notification receiver 17 receives various interruption notifications issued from the monitoring FPGA 70. Specifically, the notification receiver 17 receives a power-failure detection notification and a device error notification that the monitoring FPGA 70 inputs as NMIs.

Thereby, the notification receiver 17 functions as a device error notification receiver that receives a device error notification indicating that an error has occurred in the peripheral device 60.

The notification receiver 17 additionally receives a System Management Interrupt (SMI) input from, for example, the monitoring FPGA 70.

Upon receipt of a device error notification (NMI) from the monitoring FPGA 70 (device monitor 72), the device error processor 13 deals with the detected error of the peripheral device 60. For example, the device error processor 13 performs a process of specifying the point and the range of the occurrence of the detected error. The process of specifying the point and the range of the occurrence of the detected error is a device error process that is carried out when an error has occurred in the peripheral device 60. Hereinafter, the process to deal with an error in the peripheral device 60 is sometimes referred to as a device error process.

The device error process is not limited to specification of the point and the range of the occurrence of the error, but the contents of the process can be variously modified. Alternatively, the device error process may notify the operator or the like of the occurrence of the error in the peripheral device 60.

Upon receipt of a device error notification (NMI) from the monitoring FPGA 70 (device monitor 72), the power-failure confirmer 14 confirms whether or not power failure is occurring.

Specifically, the power-failure confirmer 14 issues, to the monitoring FPGA 70, an inquiry to confirm whether power failure is occurring.

The monitoring FPGA 70 replies to the power-failure confirmer 14 with information (power-failure state information) indicating as to whether or not the storage device 100 is in the state of power failure. If the storage device 100 is in the state of power failure, the monitoring FPGA 70 (power-failure detector 71) replies to the power-failure confirmer 14 with a signal indicating being in the state of power failure or by setting a flag indicating being in the state of the power failure in a predetermined storing region such as a register.

As described above, when the device error notification receiver receives a device error notification, the power-failure confirmer 14 confirms whether the power supply from the power source is halted.

When the monitoring FPGA 70 (device monitor 72) detects a device error and outputs a device error notification and the power-failure confirmer 14 responsively confirms that the storage device 100 is in the state of power failure, the inhabitation processor 15 inhibits the device error processor 13 from performing a device error process.

This means that the inhabitation processor 15 functions as, when the power-failure confirmer 14 confirms that the power supply from the non-illustrated power source, a first inhibitor that inhibits execution of a device error process, which is carried out when an error has occurred in the peripheral device 60.

In the following description, a kernel device error process in the NMI level of a kernel 200 represents a series of processing that, in response to input of a device error notification by means of a NMI from the monitoring FPGA 70, the power-failure confirmer 14 issues an inquiry to confirm whether power failure is occurring to the monitoring FPGA 70 and the inhabitation processor 15 inhibits the device error processor 13 from carrying out the device error process.

The API invalidating processor 16 invalidates a peripheral device access API 210 (API 210, see FIG. 3) that the kernel 200 provides.

Figure 3:
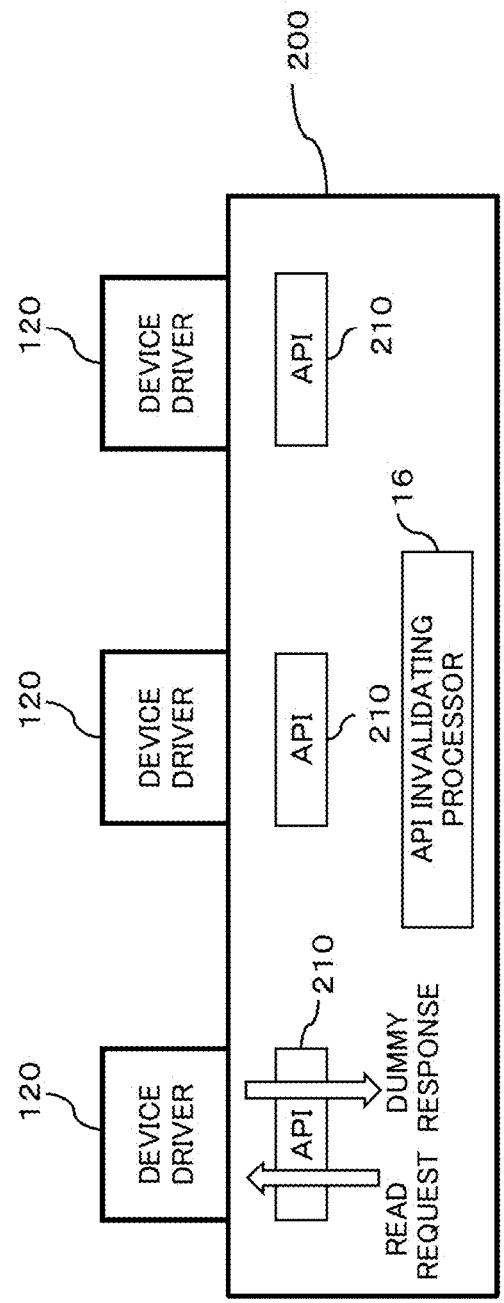
FIG. 3 is a diagram illustrating a process performed by an API invalidating processor in a storage system of the embodiment.
Figure 4:
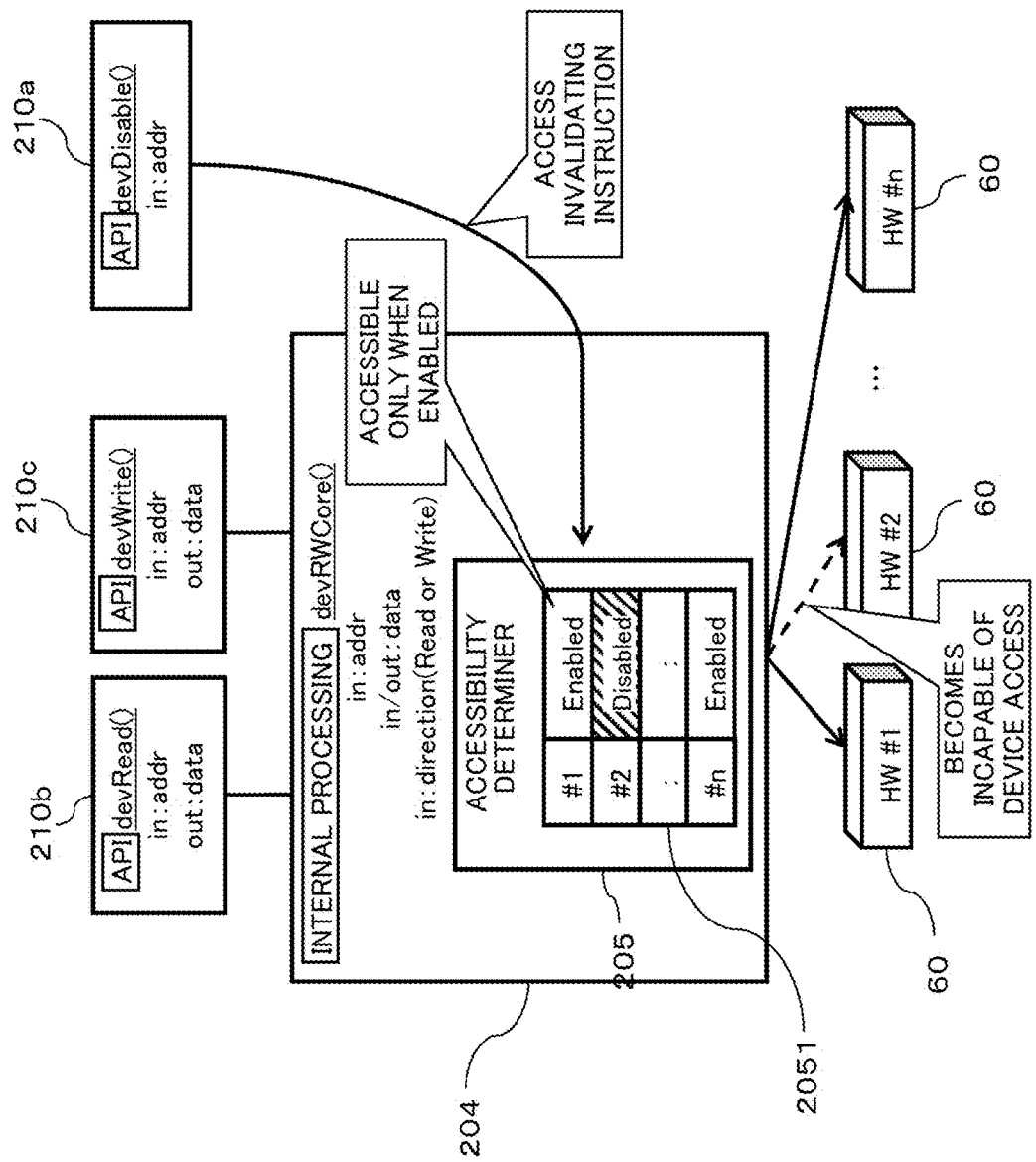
FIG. 4 is a diagram illustrating an example of a detailed process performed by an API invalidating processor in a storage system of the embodiment.

FIG. 3 denotes a process performed by the API invalidating processor 16 in the storage device 100 of an example of the first embodiment, and FIG. 4 denotes a detailed example of the process.

The peripheral device access API 210 is a program that functions as an interface with a device driver 120, and is, for example, implemented as one of the functions of the kernel 200 of the OS.

The device driver 120 is software to control the peripheral device 60 and to provide an application program (not illustrated) with an interface. The device driver 120 is provided for each peripheral device 60.

The kernel 200 communicates with each device driver 120 via the peripheral device access API 210.

The API invalidating processor 16 invalidates, when a process of a predetermined application executed by the CPU 10 issues an access request to the peripheral device 60 (i.e., the device driver 120), an access to the peripheral device 60 from the peripheral device access API 210. In other words, the API invalidating processor 16 invalidates an access request to the peripheral device 60.

The example of FIG. 4 denotes peripheral device access APIs 210b and 210c, a device access invalidating API 210a (devDisable( )), and an internal processing module 204.

The peripheral device access API 210b is an API "dev Read( )" that achieves a reading access to the peripheral device 60 while the peripheral device access API 210c is an API "dev Write( )" that achieves a writing access to the peripheral device 60. In each of the peripheral device access APIs 210b and 210c, an address (addr) is input and data (data) is output.

The internal processing module 204 is a functional module "devRWCore( )" to carry out an access process to the peripheral device 60 through the corresponding device driver 120. The data of an address (addr), the data (data), and the direction (direction) of reading or writing are input into the internal processing module 204, while data (data) is output from the internal processing module 204.

The peripheral device access APIs 210b and 210c makes an access to the peripheral device 60 via the internal processing module 204.

The internal processing module 204 further has a function as the accessibility determiner 205, which determines the accessibility of the peripheral device 60, and includes accessibility information 2051.

The accessibility information 2051 is information that manages whether each peripheral device 60 is in the accessible state (Enabled) or in the inaccessible state (Disabled). In the example of FIG. 4, the accessibility information 2051 associates the state of Enabled or Disabled with identification information (#1 to #n) to identify the respective peripheral devices 60.

Specifically, the accessibility information 2051 indicates that a peripheral device 60 set to be "Enabled" is an accessible device but a peripheral device 60 set to be "Disabled" is an inaccessible device.

The state "Disabled" is set into the accessibility information 2051 by the device access invalidating API 210a.

The device access invalidating API 210a is an API "dev Disable( )" that invalidates the access to the peripheral device 60 and an address (addr) is input thereto. The device access invalidating API 210a sets the state "Disabled" into the accessibility information 2051 of a peripheral device 60 for which an access is to be invalidated. Setting the state "Disabled" into the accessibility information 2051 by the device access invalidating API 201a corresponds to an access invalidating instruction.

When the peripheral device access APIs 210b and 210c make access requests (request for reading access and request for writing access) to the peripheral device 60, the internal processing module 204 refers to the accessibility information 2051 of the target peripheral device 60. As the result of the referring, the internal processing module 204 executes the reading access and a writing access only to a peripheral device 60 for which the accessibility information 2051 is set to be "Enabled".

In other words, the internal processing module 204 inhibits execution of a reading access and a writing access to a peripheral device 60 for which the accessibility information 2051 is set to be "Disabled".

In the example of FIG. 4, the device access invalidating API 210a and the internal processing module 204 achieve the function as the API invalidating processor 16.

In the example of FIG. 4, a peripheral device 60 having the identification information #2 is set to be "Disabled" in the accessibility information 2051 and an access to the peripheral device 60 having the identification information #2 is invalidated.

For example, when a process of a predetermined application executed by the CPU 10 issues a request for data reading from a peripheral device 60, the peripheral device access API 210b issues a reading request to the internal processing module 204.

If the state "Disabled" is set for the target peripheral device 60 in the accessibility information 2051, the internal processing module 204 (API invalidating processor 16) abandons the reading request.

This prevents the device driver 120 from executing a reading request to the peripheral device 60 being in the state of not being supplied with power. This avoids possible occurrence of a system error caused from the reading request to the peripheral device 60 in the state of not being supplied with power.

The internal processing module 204 (API invalidating processor 16) abandons a request for reading data from the above peripheral device 60 (device driver 120) and also replies to the process that has issued to this reading request with a predetermined signal (dummy signal) that indicates occurrence of an device error. Hereinafter, replying of the API invalidating processor 16 (internal processing module 204) to the issuing source of the reading request with a dummy response is sometimes referred to as "dummy response".

As the above, during the process that has issued a reading request to the peripheral device 60 in the state of not being supplied with power, the dummy response from the API invalidating processor 16 makes it possible to avoid occurrence of a system error caused by not responding from the peripheral device 60.

An example of a dummy signal is a bit string "fff . . . f" having all the bits being "f" and being formed of a predetermined number of bits. However, a dummy signal may be variously modified according to the OS and the specification of the system.

When the process of a predetermined application executed by the CPU 10 issues a request for writing data into a peripheral device 60, the peripheral device access API 210c issues a writing request to the internal processing module 204.

If the state "Disabled" is set for the target peripheral device 60 in the accessibility information 2051, the internal processing module 204 (API invalidating processor 16) abandons the writing request.

This prevents the device driver 120 from executing a writing request to the peripheral device 60 being in the state of not being supplied with power. This avoids possible occurrence of a system error caused from a writing request to the peripheral device 60 in the state of not being supplied with power.

The second power-failure processor 202 has a function as a function controller 18.

The function controller 18 controls various functions carried out on the application level in the storage device 100. For example, the function controller 18 carries out controls for activating various programs (threads) performed on the OS and also for inhibiting execution of these threads.

For example, the function controller 18 causes the third power-failure processor 203 to function as the backup processor 11 by calling a predetermined function (power-failure processing function).

Furthermore, the function controller 18 performs control of inhibiting, while the backup processor 11 is being carrying out a memory backup process, an element except for the backup processor 11 from executing a process (thread) on the application level.

This avoids generation of unnecessary access to the peripheral device 60 during the memory backup process, so that a system error caused by accessing a peripheral device 60 being in the state of not supplying with power can be prevented.

The function controller 18 is activated by, for example, a trap issued from the first power-failure processor 201. This trap issued from the first power-failure processor 201 to the second power-failure processor 202 is an Inter-Processor Interrupt (IPI), which is issued to shift the kernel 200 into the normal level. Hereinafter, the IPI is sometimes referred to as "call a kernel power-failure processing".

The functions as the first power-failure processor 201 and the second power-failure processor 202 described above are achieved by, for example, the CPU 10 executing the kernel 200 of the OS. Specifically, the first power-failure processor 201 is executed on the NMI level of the kernel 200 while the second power-failure processor 202 is executed on the normal level of the kernel 200.

The function as the third power-failure processor 203 is achieved by, for example, the CPU 10 executing the firmware.

The program (i.e., firmware and the OS (kernel 200)) that achieves the functions of the first power-failure processor 201, the second power-failure processor 202, and the third power-failure processor 203 is provided in the form of being recorded in a tangible and non-transient computer-readable storage medium, such as a flexible disk, a CD (e.g., CD-ROM, CD-R, and CD-RW), a DVD (DVD-ROM, DVD-RAM, DVD-R, DVD+R, DVD-RW, DVD+RW, and HD DVD), a Blu-ray disk, a magnetic disk, an optical disk, an magneto-optical disk. A computer reads the program from the recording medium and stores the read program in an internal or external storage device for future use. Alternatively, the program may be recorded in a recording device (recording medium) such as a magnetic disk, an optical disk, or a magneto-optical disk, and may be provided from the recording device to the computer via a communication path.

Further alternatively, in achieving the functions of the first power-failure processor 201, the second power-failure processor 202, and the third power-failure processor 203, the program stored in an internal storage device (corresponding to the memory 20 in the first embodiment) is executed by the microprocessor (corresponding to the CPU 10 in the first embodiment) of the computer. At that time, the computer may read the program stored in the recording medium and may execute the program.

(B) Operation:

Description will now be made in relation to a process performed when power failure occurs in the storage device 100 according to an example of the first embodiment by referring to the sequence diagrams FIGS. 5 and 6. FIG. 6 denotes a process subsequent to the process denoted FIG. 5.

Figure 5:
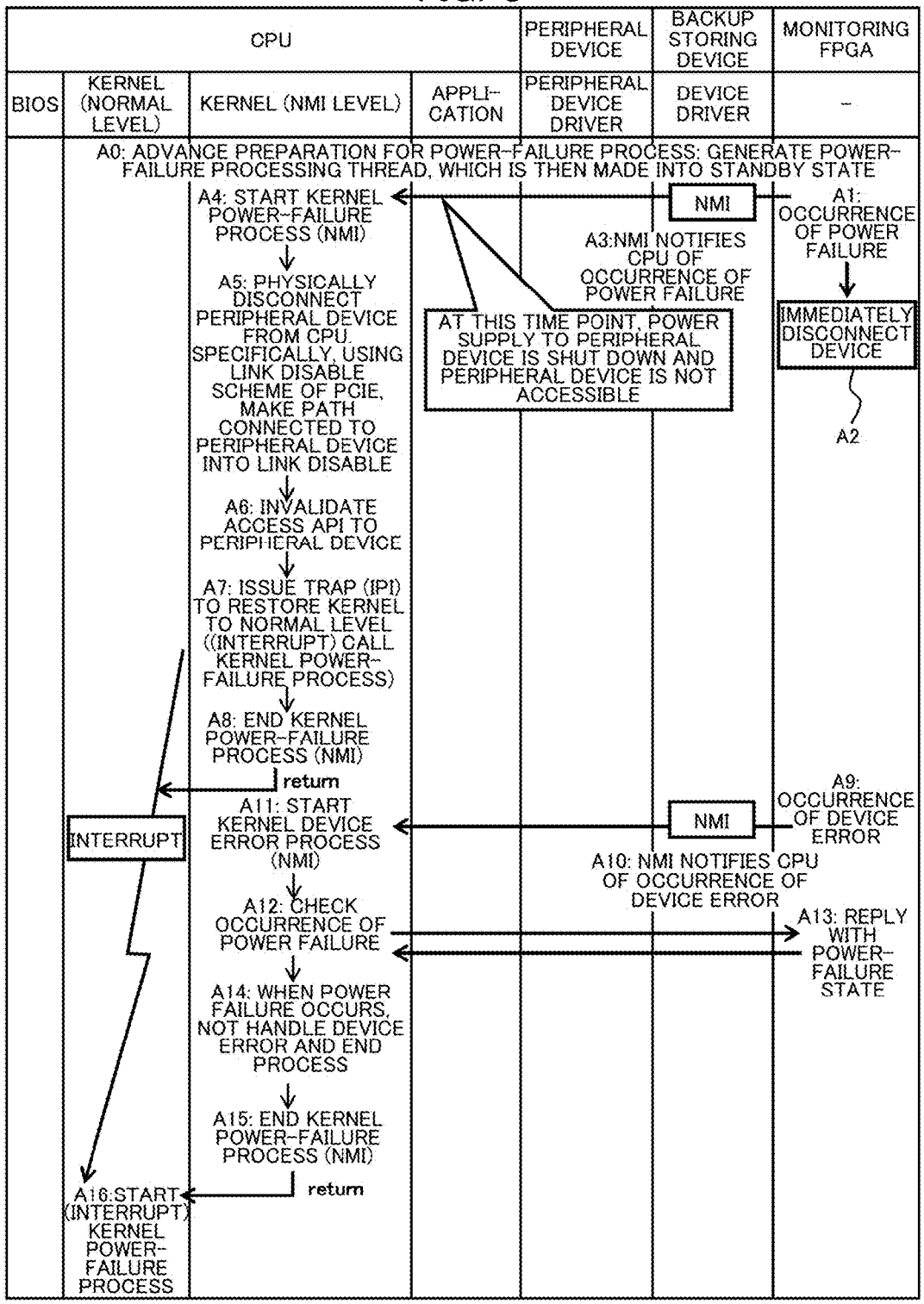
FIG. 5 is a sequence diagram denoting a process performed in the event of power failure in the storage system of the embodiment.
Figure 6:
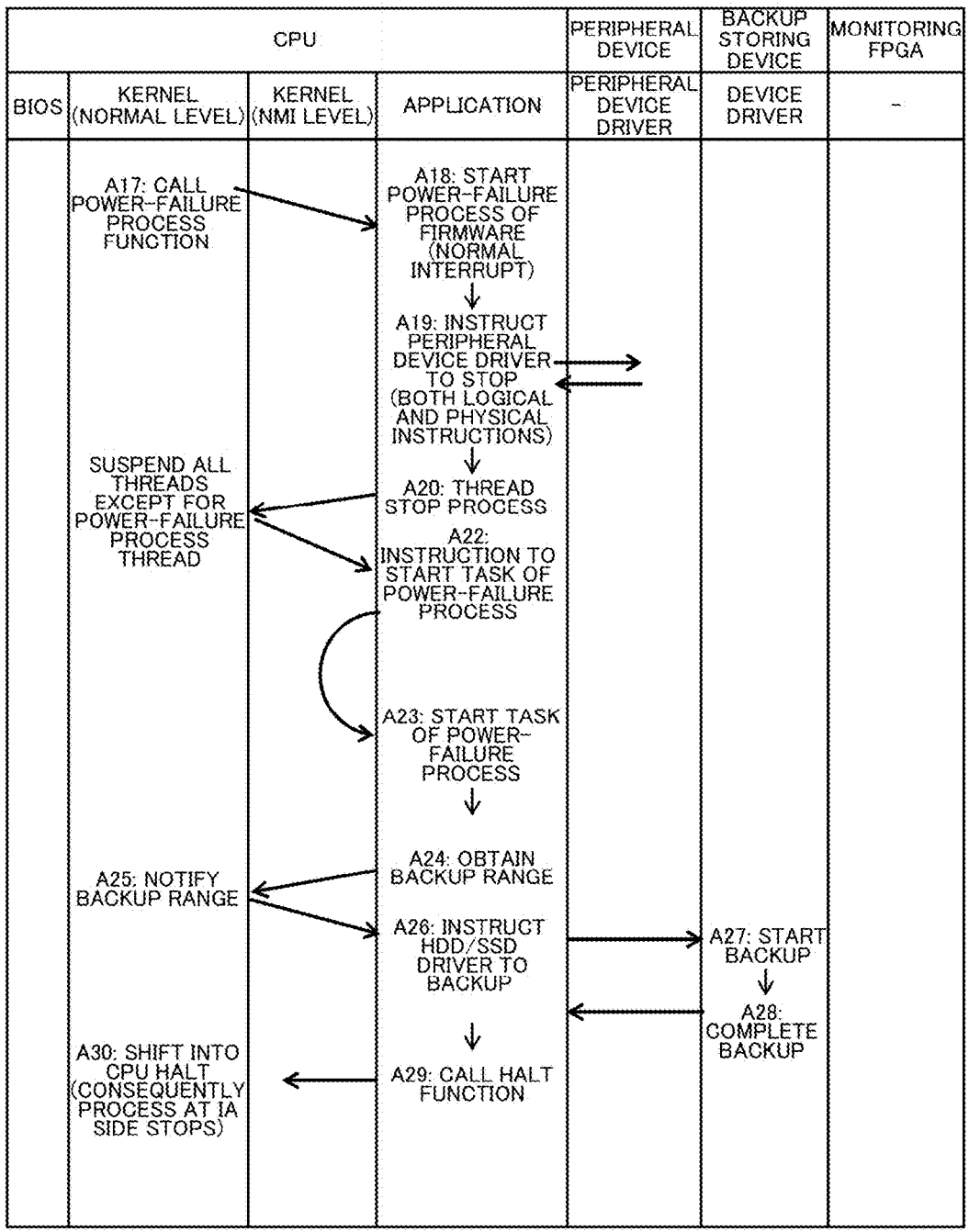
FIG. 6 is a sequence diagram denoting a process performed in the event of power failure in the storage system of the embodiment.

To begin with, advance preparation is carried out by generating a power-failure processing thread, which is then come into a standby state (see the reference number A0 in FIG. 5).

When power supply from the power source is halted in the storage device 100 and subsequently power failure occurs, the power-failure detector 71 of the monitoring FPGA 70 detects the occurrence of power failure (see the reference number A1 in FIG. 5). In the event of occurrence of the power failure, the power supply to the peripheral device 60 is immediately shut down (see the reference number A2 in FIG. 5).

The power-failure detector 71 of the monitoring FPGA 70 issues a power-failure detection notification to the CPU 10 by means of NMI (see the reference number A3 in FIG. 5). At this time point, the power supply to the peripheral device 60 is shut down and the peripheral device 60 is not accessible from, for example, the CPU 10.

When the power-failure detection notification by means of NMI is input into the CPU 10, the kernel 200 starts a power-failure process on the NMI level (see the reference number A4 in FIG. 5). First of all, the disconnector 12 disconnects the communication between the CPU 10 and the peripheral device 60 (see the reference number A5 in FIG. 5). Specifically, the disconnector 12 makes the path connecting the CPU 10 to the peripheral device 60 into the link disable state, using the Link Disable function of the PCIe.

Besides, the API invalidating processor 16 invalidates the peripheral device access APIs 210 (see the reference number A6 in FIG. 5).

Furthermore, the memory 201 issues a trap (IPI) to the second power-failure processor 202 and thereby instructs the second power-failure processor 202 (the function controller 18) to start a kernel power-failure process (call kernel power-failure process, see the reference number A7 in FIG. 5). The power-failure process on the NMI level of the kernel 200 ends (see the reference number A8 in FIG. 5), and the kernel 200 is restored (shifts) into the normal level.

If the power failure occurred while the device driver 120 of the peripheral device 60 was carrying out a process, the device driver 120 resumes the same process at this timing. Generating an access to the peripheral device 60 while the power supply to the peripheral device 60 is halted causes a device failure.

If a device error occurs in the peripheral device 60, the device monitor 72 of the monitoring FPGA 70 detects the error of the same peripheral device 60 (see the reference number A9 of FIG. 5) and issues a device error notification to the CPU 10 by means of NMI (see the reference number A10 of FIG. 5).

When the device error notification is input into the CPU 10 by means of NMI, the kernel 200 starts a kernel device error process on the NMI level (see the reference number A11 of FIG. 5).

First of all, the power-failure confirmer 14 issues an inquiry as to whether power failure is occurring to the monitoring FPGA 70 (see the reference number A12 of FIG. 5). The monitoring FPGA 70 replies to the power-failure confirmer 14 with power-failure state information in response to the inquiry (see the reference number A13 of FIG. 5).

If the power failure is occurring as the result of the confirmation, the inhabitation processor 15 of the first power-failure processor 201 carry out control of inhibiting the device error processor 13 from executing the device error processing. This means that, in the event of occurrence of power failure, the device error processor 13 does not handle the device error and ends the process (see the reference number A14 of FIG. 5). Here, the kernel 200 ends the kernel power-failure process on the MNI level (see the reference number A15 of FIG. 5) and is then restored (shifts) into the normal level. Even when a device error in the peripheral device 60 is detected, occurrence of a system error can be avoided by the inhabitation processor inhibiting the device error processor 13 from executing the device error process as detailed above.

Upon received an interruption (IPI) of calling a kernel power-failure processing from the first power-failure processor 201, the second power-failure processor 202 starts a kernel power-failure processing on the normal level of the kernel 200 (see the reference number A16 of FIG. 5). This interruption is activated in the state of being masked.

The function controller 18 calls a power-failure processing function (see the reference number A17 of FIG. 6). This causes the firmware to start the execution of a power-failure process (see the reference number A18 of FIG. 6).

Further, on the application level, the device driver 120 of the peripheral device 60 is instructed to stop (see the reference number A19 of FIG. 6). This stop instruction directs both logical and physical instructions.

At this time point, since the API invalidating processor 16 invalidates the peripheral device access APIs 210 as described above (see the reference number A6 of FIG. 5), even generation of an access to the peripheral device 60 does not cause a system error.

After that, the third power-failure processor 203 carries out a process to stop a thread currently being executed (see the reference number A20 of FIG. 6). In response to this process, the function controller 18 of the second power-failure processor 202 suspends all the threads except for the power-failure process thread (see the reference number A21 of FIG. 6). This stops threads, such as patrol for system control and a thread for Basic, to avoid generation an access to the peripheral device 60 being in the inaccessible state, so that the storage device 100 being in the state of power failure can be stably operated.

Next, the application level is instructed to start a task of the power-failure processing (see the reference number A22 of FIG. 6). Also at this time point, although there is a possibility of an access to the peripheral device 60 is generated to cause a device error, the inhabitation processor 15 controls to inhibit the device error processor 13 from execution of the device error process as described above, and consequently occurrence of a system error can be avoided.

In response to the instruction to start the task of the power-failure process, the backup processor 11 starts the task of power-failure process, that is, the memory backup process (see the reference number A23 of FIG. 6). The backup processor 11 issues a request to obtain a backup range in the memory 20 (see the reference number A24 of FIG. 6), and the kernel 200 (normal level) responsively replies to the backup processor 11 with the backup target region of the memory 20 as the backup range (see the reference number A25 of FIG. 6). The backup processor 11 instructs the device driver 120 of the backup storing device 30 to back up data in the responded backup range into the backup storing device 30 (see the reference number A26 of FIG. 6).

Upon receipt of the backup instruction, the device driver 120 starts backing up data into the backup storing device 30 (see the reference number A27 of FIG. 6). Specifically, the device driver 120 reads data from the backup target region in the memory 20 through the memory controller 22 and stores the read data into the backup storing device 30.

When backing up the entire data in the backup target region in the memory 20 is completed (see the reference number A28 of FIG. 6), the device driver 120 for the backup storing device 30 issues a completion notification to the backup processor 11.

The backup processor 11, which receives the completion notification of the backup, calls a halt function (the reference number A29 of FIG. 6). Then the kernel 200 stops the CPU 10 in the normal level and shifts the CPU 10 into the state of the CPU halt (the reference number A30 of FIG. 6), which stops the process being performed in the CPU 10.

(C) Effects

As described above, in the storage device 100 of the first embodiment, the disconnector 12 receives a power-failure detection notification from the monitoring FPGA 70 and then disconnects the communication between the CPU 10 and the peripheral device 60.

This disconnects the communication between the CPU 10 and the peripheral device 60, so that the peripheral device (PCIe device) 60 is invalidated. Consequently, while the backup processor 11 is executing the memory backup process under a state of power failure in the storage device 100, an access to the peripheral device 60 to which power supply is shut down is avoided. This makes it possible to avoid occurrence of the system error caused by accessing the peripheral device 60 being in the state of not being supplied with power.

When the monitoring FPGA 70 detects a device error and issues a device error notification and the power-failure confirmer 14 confirms that the storage device 100 is in the state of power failure, the inhabitation processor 15 carries out control of inhibiting the device error processor 13 from executing a device error process.

Even when the device error of the peripheral device 60 is detected, the control performed by the inhabitation processor 15 to inhibit the device error processor 13 from executing a device error process avoids occurrence of a system error.

The API invalidating processor 16 invalidates the peripheral device access APIs 210 that the kernel 200 provides.

This prevents the device driver 120 from executing a reading request to the peripheral device 60 being in the state of not being supplied with power, so that a system error caused by such a reading request from the peripheral device 60 being in the state of not being supplied with power can be avoided.

The above configuration can omit an FPGA (power-failure FPGA) to back up data in the memory 20 into the backup storing device 30 when the storage device 100 is in the state of power failure. Advantageously, the production costs for the system can be reduced.

(D) Modifications (D-1) First Modification:

The technique disclosed herein is not limited to the above first embodiment. Various changes and modifications can be suggested without departing from the purpose of the first embodiment.

For example, in the above first embodiment, when the monitoring FPGA 70 (power-failure detector 71) detects occurrence of power failure, the monitoring FPGA 70 notifies the CPU 10 of the occurrence of power failure (power-failure detection notification) by means of NMI and the CPU 10 controls the power-failure process by functioning as the first power-failure processor 201, the second power-failure processor 202, and the third power-failure processor 203. However, the manner of the power-failure process is not limited to this.

In the first modification, the CPU 10 controls the power-failure process through a process of the Basic Input Output System (BIOS). This means that the BIOS includes a module that exerts the function as the backup processor 11 of the above first embodiment, and also includes another module that exerts the function as the device driver 120 for the backup storing device 30.

In order to selectively execute a particular process provided by the BIOS, the monitoring FPGA 70 (power-failure detector 71) has a function of notifying, upon detection of occurrence of power failure, the CPU 10 of the occurrence of power failure by means of SMI.

Figure 7:
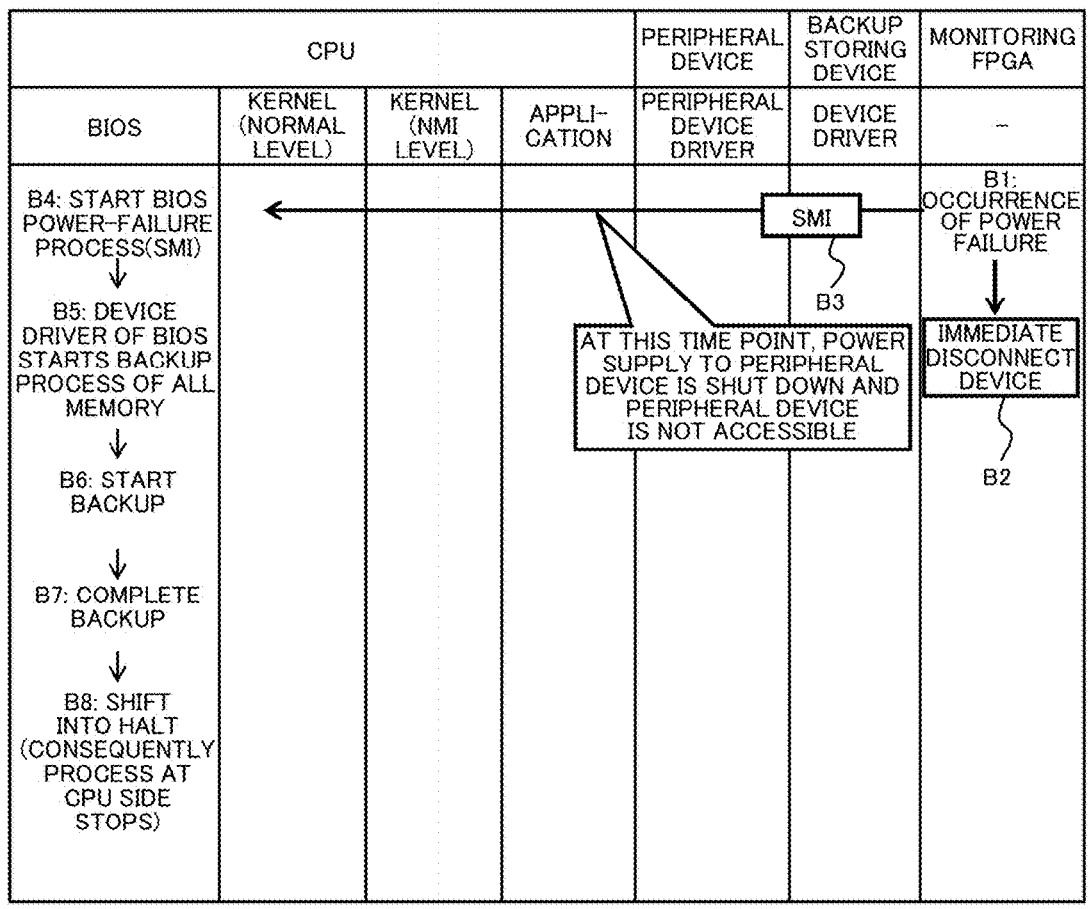
FIG. 7 is a sequence diagram denoting a process performed in the event of power failure in the storage system according to a first modification of the embodiment.

Description will now be made in relation to the process performed when the power failure occurs in the storage device 100 having the above configuration according to the first modification by referring to the sequence diagram in FIG. 7.

To begin with, when power supply from the power source is halted to cause power failure in the storage device 100, the power-failure detector 71 of the monitoring FPGA 70 detects the occurrence of power failure (see the reference number B1). In the event of occurrence of power failure, the power supply to the peripheral device 60 is immediately shut down (see the reference number B2).

The power-failure detector 71 of the monitoring FPGA 70 issues a power-failure detection notification to the CPU 10 by means of SMI (see the reference number B3). At this time point, the power supply to the peripheral device 60 is shut down and the peripheral device 60 is not accessible from, for example, the CPU 10.

When the power-failure detection notification by means of the SMI is input into the CPU 10, the BIOS starts a power-failure process (see the reference number B4).

First of all, the function as the device driver 120 for the backup storing device 30 of the BIOS activates the function as the backup processor 11, and then the memory backup process is started (see the reference number B5).

Using the function as the backup processor 11, the BIOS starts the backup into the backup storing device (see the reference number B6). Specifically, the BIOS reads data from the backup target region of the memory 20 via the memory controller 22 and stores the read data into the backup storing device 30.

Upon completion of backup of the entire data in the backup target region of the memory 20 (see the reference number B7), the BIOS shifts into the halt (see the reference number B8). Thereby the process performed in the CPU 10 is stopped.

In the first modification, since the device driver 120 of the peripheral device 60 is invalidated when power failure is occurring, an access to the peripheral device 60 is not generated. Accordingly, it is possible to avoid occurrence of a system error caused from a data access to the peripheral device 60 being in the state of not being supplied with power while the BIOS is carrying out the memory backup process in the event of occurrence of power failure.

Furthermore, the above configuration of the first modification can omit an FPGA (power-failure FPGA) to back up data in the memory 20 into the backup storing device 30 when the storage device 100 is in the state of power failure. Advantageously, the production costs for the system can be reduced.

(D-2) Second Modification:

In the above first embodiment, upon detection of occurrence of power failure, the monitoring FPGA 70 (power-failure detector 71) issues the power-failure detection notification to the CPU 10 by means of SMI, but the manner of notifying the power-failure detection is not limited to this.

In the second modification, upon detection of occurrence of power failure, the monitoring FPGA 70 (power-failure detector 71) notifies the CPU 10 of occurrence of power failure by means of NMI (the power-failure detection notification).

The CPU 10 has a function as the notification receiver 17 on the NMI level of the kernel 200 and therefore receives the power-failure detection notification from the monitoring FPGA 70 via NMI.

Upon receipt of the power-failure detection notification from the monitoring FPGA 70 via NMI, the CPU 10 carries out a kernel power-failure process on the NMI level of the kernel 200 to shift the storage device 100 into a sleep state. Specifically, the kernel power-failure process stops power supply to elements except for the memory 20, keeping the power supply to the memory 20 to retain the data in the storing region of the memory 20.

The shift into the sleep state is achieved by, for example, shifting into the sleeping mode (S3 DC-OFF/ON) of S3 in the Advanced Configuration and Power Interface (ACPI) specification. The shift into the sleeping mode of S3 of the ACPI can be accomplished in any known manner, so detailed description is omitted here. In addition, the method of shifting the storage device 100 into the sleep state is not limited to this and various alternative methods can be applied.

After the storage device 100 is shifted into the S3 sleeping mode on the NMI level of the kernel 200, the BIOS is started.

In the second modification, the BIOS, after being started, issues an inquiry to confirm whether power failure is occurring to the monitoring FPGA 70. If the monitoring FPGA 70 (power-failure detector 71) replies to the BIOS with a signal representing being in the state of power failure as the power-failure state information, the BIOS carries out the function of the backup processor 11 of the above first embodiment.

Figure 8:
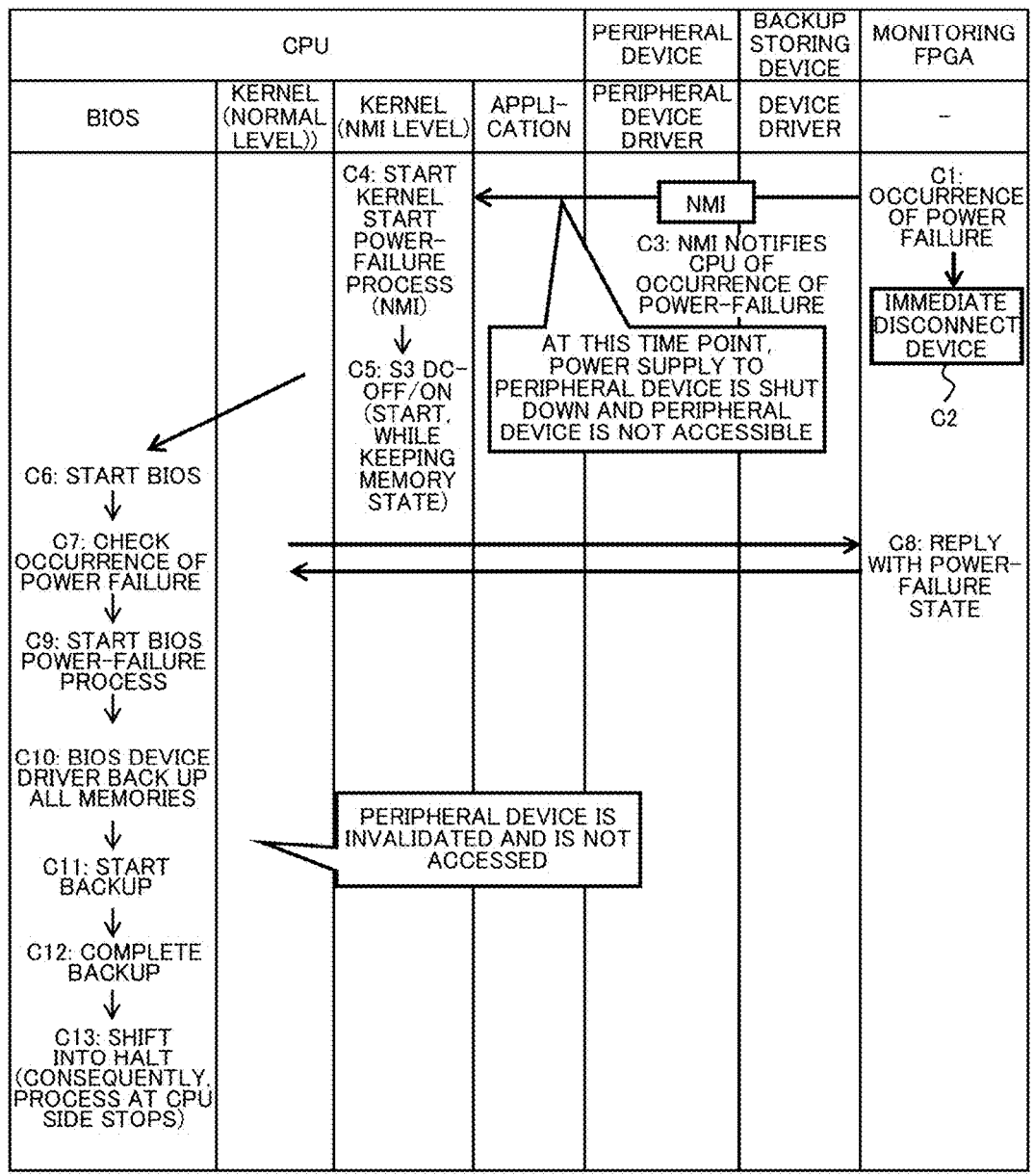
FIG. 8 is a sequence diagram denoting a process performed in the event of power failure in the storage system according to a second modification of the embodiment.
Figure 9:
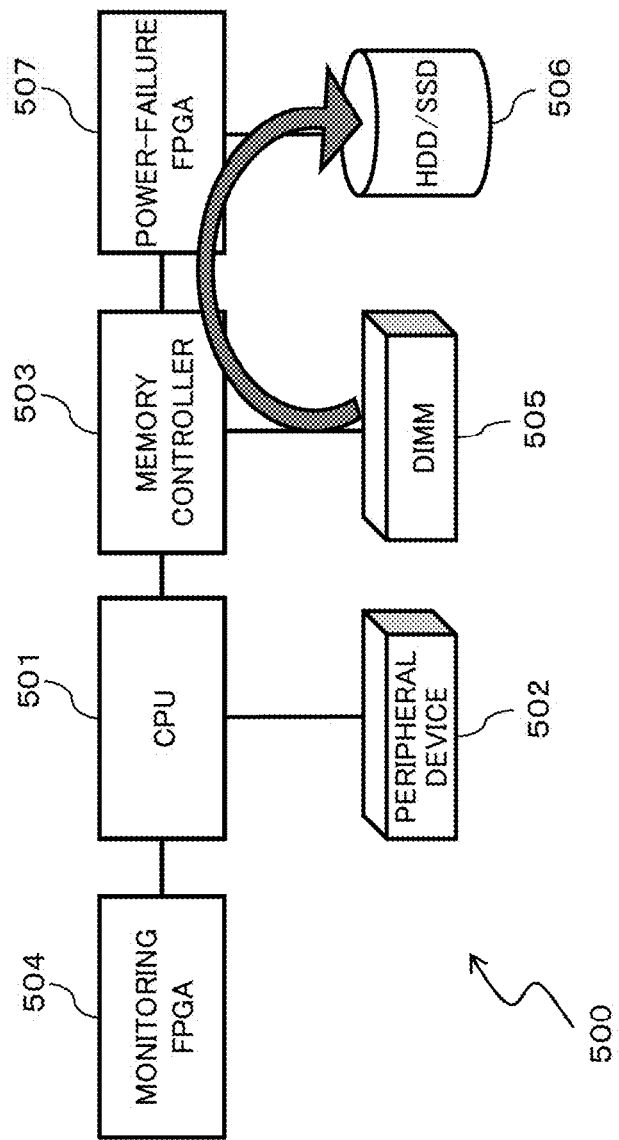
FIG. 9 is a diagram schematically illustrating the configuration of a typical power-failure dealing system.

Here, description will now be made in relation to the process performed in the storage device 100 having the above configuration according to the second modification in the event of occurrence of power failure by referring to the sequence diagram FIG. 8.

When power supply from the power source in the storage device 100 is halted and subsequently power failure occurs, the power-failure detector 71 of the monitoring FPGA 70 detects occurrence of the power failure (see the reference number C1). In the event of the occurrence of power failure, the power supply to the peripheral device 60 is immediately shut down (see the reference number C2).

The power-failure detector 71 of the monitoring FPGA 70 issues a power-failure detection notification to the CPU 10 by means of NMI (see reference number C3). At this time point, the power supply to the peripheral device 60 is shut down and the peripheral device 60 is not accessible from the CPU 10.

When the power-failure detection notification by means of NMI is input into the CPU 10, the kernel 200 starts a power-failure process on the NMI level (see the reference number C4). Specifically, the kernel 200 starts the S3 DC-OFF/ON, keep retaining the data in the storing region of the memory 20 (see the reference number C5).

After the S3 DC-OFF/ON is started on the NMI level of the kernel 200, the BIOS is started (see the reference number C6).

To begin with, the BIOS confirms whether power failure is occurring (see the reference number C7). Specifically, the BIOS issues an inquiry to confirm whether power failure is occurring to the monitoring FPGA 70, which responsively replies to the BIOS with power-failure state information (see the reference number C8).

When the storage device 100 is confirmed to be in the state of power failure, the BIOS starts a power-failure process (see the reference number C9). Specifically, the function as the device driver 120 for the backup storing device 30 which function is included in the BIOS activates the function as the backup processor 11, and then the memory backup process is started.

Using the function as the backup processor 11, the BIOS starts the backup into the backup storing device 30 (see the reference number C10). Specifically, the backup process is started (see reference number C11), so that the BIOS reads data from the backup target region of the memory 20 via the memory controller 22 and stores the read data into the backup storing device 30.

Upon completion of backup of the entire data in the backup target region of the memory 20 (see the reference number C12), the BIOS shifts into the halt (see the reference number C13). Thereby the process performed in the CPU 10 is stopped.

Also in the first modification, since the device driver 120 of the peripheral device 60 is invalidated when power failure is occurring, an access to the peripheral device 60 is not generated. Accordingly, it is possible to avoid occurrence of a system error caused from a data access to the peripheral device 60 being in the state of not being supplied with power while the BIOS is carrying out the memory backup process in the event of occurrence of the power failure.

Furthermore, the above configuration of the second modification can omit an FPGA (power-failure FPGA) to back up data in the memory 20 into the backup storing device 30 when the storage device 100 is in the state of power failure. Advantageously, the production costs for the system can be reduced.

(E) Others:

The above first embodiment assumes that the backup target region is a predetermined region to store writing data of the RAID cache, and a copy of data stored in the backup target region is stored in the backup storing device 30. However, the present invention is not limited to this.

Alternatively, the backup target region may be a predetermined region serving as the memory log segment of the memory 20, in which logs (management information) related to various processes performed in the CM 101 are stored. The logs include a log of failure information. Examples of a log here are an error log, an event log, a degrade log, and a degrade factor log and is generated by the CPU 10 of the CM 101 by carrying out an error detecting function.

In the above embodiment, the communication between the CPU 10 and the peripheral device (PCIe device) 60 is disconnected by the CPU 10, which functions as the disconnector 12, invalidating the peripheral device 60, using the disable function of the PCIe. However, the manner of disconnecting the communication is not limited to this. Alternatively, a circuit element, such a switch, capable of disconnecting a communication may be arranged on the bus between the CPU 10 and the peripheral device 60, and the disconnector 12 may issue a disconnection instruction to this switch, which responsively disconnects the communication between the CPU 10 and the peripheral device 60.

Further alternatively, the communication between the CPU 10 and the peripheral device 60 may be disconnected by inputting, as the disconnection instruction, the power-failure detection notification output from the monitoring FPGA 70 to the switch. This means that the monitoring FPGA 70 may alternatively function as the disconnector 12.

Those ordinarily skilled in the art can carryout and manufacture the embodiment and the modifications thereof by referring to the above disclosure.

According to the first embodiment and the modifications thereof, the memory backup process can be successfully accomplished even in the event of power failure.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An information processing apparatus comprising a processor in communication with a monitoring field programmable gate array (FPGA) having a power-failure detector, a peripheral device being accessed and controlled by the processor, a storing device, and a memory, the information processing apparatus further comprising:
   a monitoring circuit that detects a halt of a power supply from a power source;
   a standby power supply unit with a battery and that supplies, when the power supply from the power source is halted, standby power from the battery to the processor, the memory, and the storing device; and
   when the monitoring circuit detects the halt of the power supply from the power source, the processor disconnects a communication path between the processor and the peripheral device by invalidating an application programming interface to reduce an amount of power consumed from the standby power supply unit by the peripheral device, invalidates an access request to the peripheral device from the application programming interface, and carries out a memory backup process that reads data from the memory and stores the data into the storing device.

2. The information processing apparatus according to claim 1, further comprising:
   a device error notification receiver that receives a device error notification indicating that a device error occurs in the peripheral device;
   a power-failure confirmer that confirms, when the device error notification receiver receives the device error notification, whether the power supply from the power source is halted; and
   a first inhibitor that inhibits, when the power supply from the power source is halted, the processor from carrying out a device error process, the device error process being carried out when an error occurs in the peripheral device.

3. The information processing apparatus according claim 1, further comprising a second inhibitor that inhibits, while the processor is carrying out the memory backup process, the processor from carrying out a process except for the memory backup process.

4. The information processing apparatus according to claim 1, further comprising:
   accessibility information that manages whether each peripheral device is in an accessible state or in an inaccessible state; and
   an invalidating processor that invalidates, when the power-failure detector detects the halt of the power supply from the power source, an access request to the peripheral device with reference to the accessibility information.

5. The information processing apparatus according to claim 4, wherein, when a request for data reading from the peripheral device is issued as the access request, the processor invalidates the access request by abandoning the request for data reading and replying to a process that had issued the request for data reading with a dummy signal representing occurrence of a device error.

6. The information processing apparatus according to claim 4, wherein, when a request for data writing into the peripheral device is issued as the access request, the processor invalidates the access request by abandoning the request for data writing.

7. An information processing apparatus comprising a processor in communication with a monitoring field programmable gate array (FPGA) having a power-failure detector, a peripheral device being accessed and controlled by the processor, a storing device, and a memory, the information processing apparatus further comprising:

a monitoring circuit that detects a halt of a power supply from a power source;

a standby power supply unit with a battery and that supplies, when the power supply from the power source is halted, standby power from the battery to the processor, the memory, and the storing device;

a starting program that causes the processor to start the information processing apparatus comprises a module that causes the processor to carry out a memory backup process that reads data from the memory and stores the data into the storing device; and when the monitoring circuit detects the halt of the power supply from the power source, the processor disconnects a communication path between the processor and the peripheral device by invalidating an application programming interface to reduce an amount of power consumed from the standby power supply unit by the peripheral device and invalidates an access request to the peripheral device from the application programming interface, and the monitoring circuit inputs a first interruption notification into the processor, and upon receipt of the first interruption notification from the monitoring circuit, the processor carries out the memory backup process by executing the module of the starting program.

8. An information processing apparatus comprising a processor in communication with a monitoring field programmable gate array (FPGA) having a power-failure detector, a peripheral device being accessed and controlled by the processor, a storing device, and a memory, the information processing apparatus further comprising:

a monitoring circuit that detects a halt of a power supply from a power source;

a standby power supply unit with a battery and that supplies, when the power supply from the power source is halted, standby power from the battery to the processor, the memory, and the storing device;

a starting program that causes the processor to start the information processing apparatus comprises a module that causes the processor to carry out a memory backup process that reads data from the memory and stores the data into the storing device; and when the monitoring circuit detects the halt of the power supply from the power source, the processor disconnects a communication path between the processor and the peripheral device by invalidating an application programming interface to reduce an amount of power consumed from the standby power supply unit by the peripheral device and invalidates an access request to the peripheral device from the application programming interface, and the monitoring circuit inputs a second interruption notification into the processor, upon receipt of the second interruption notification from the monitoring circuit, the processor shifts the information processing apparatus into a sleep state that halts the power supply to the information processing apparatus, keeping supply of the standby power to the memory, and then starts the starting program, and the starting program confirms whether the power supply from the power source is halted and, when the power supply from the power source is halted, carries out the memory backup process by executing the module.

* * * * *